Patented Nov. 9, 1943

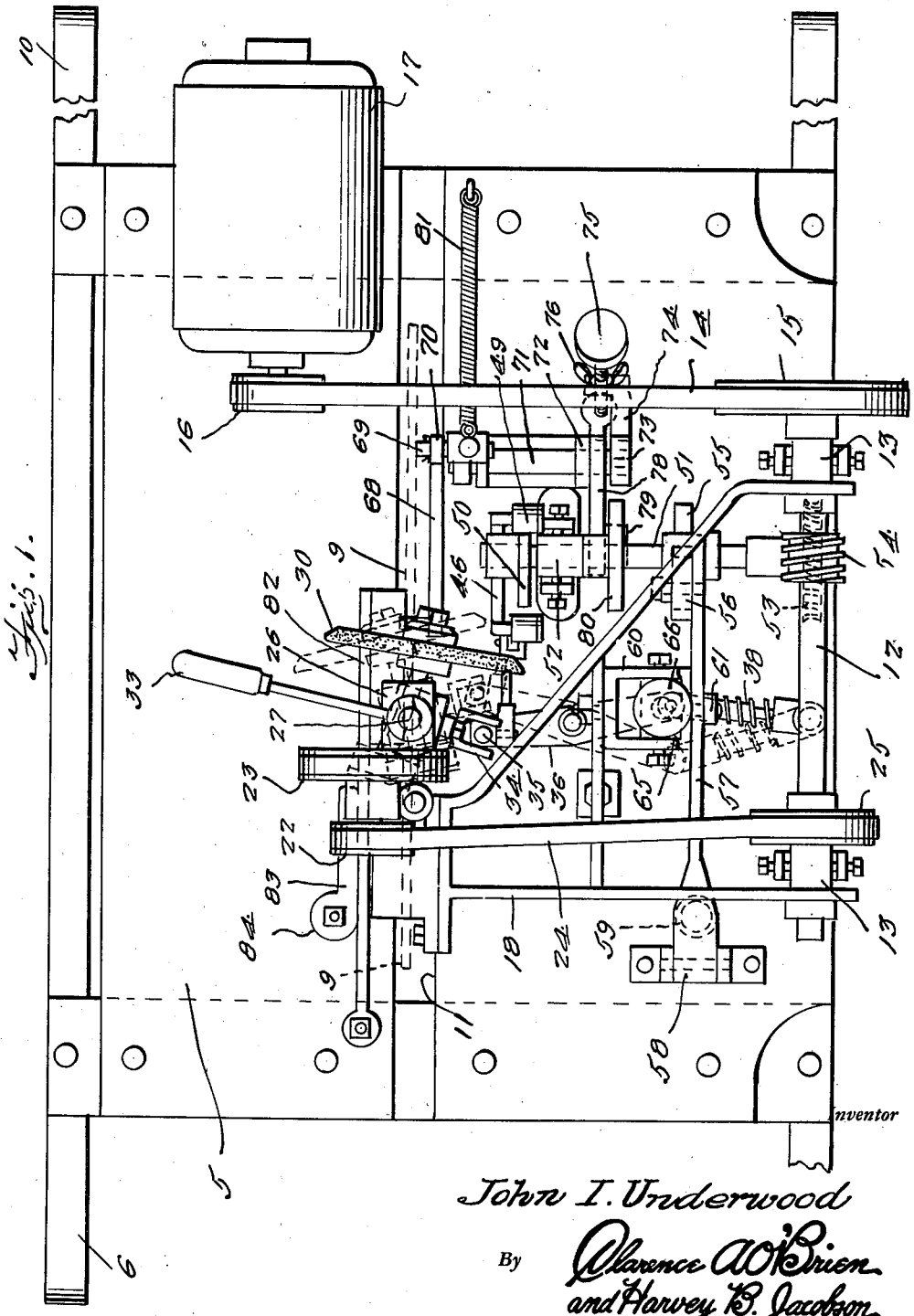

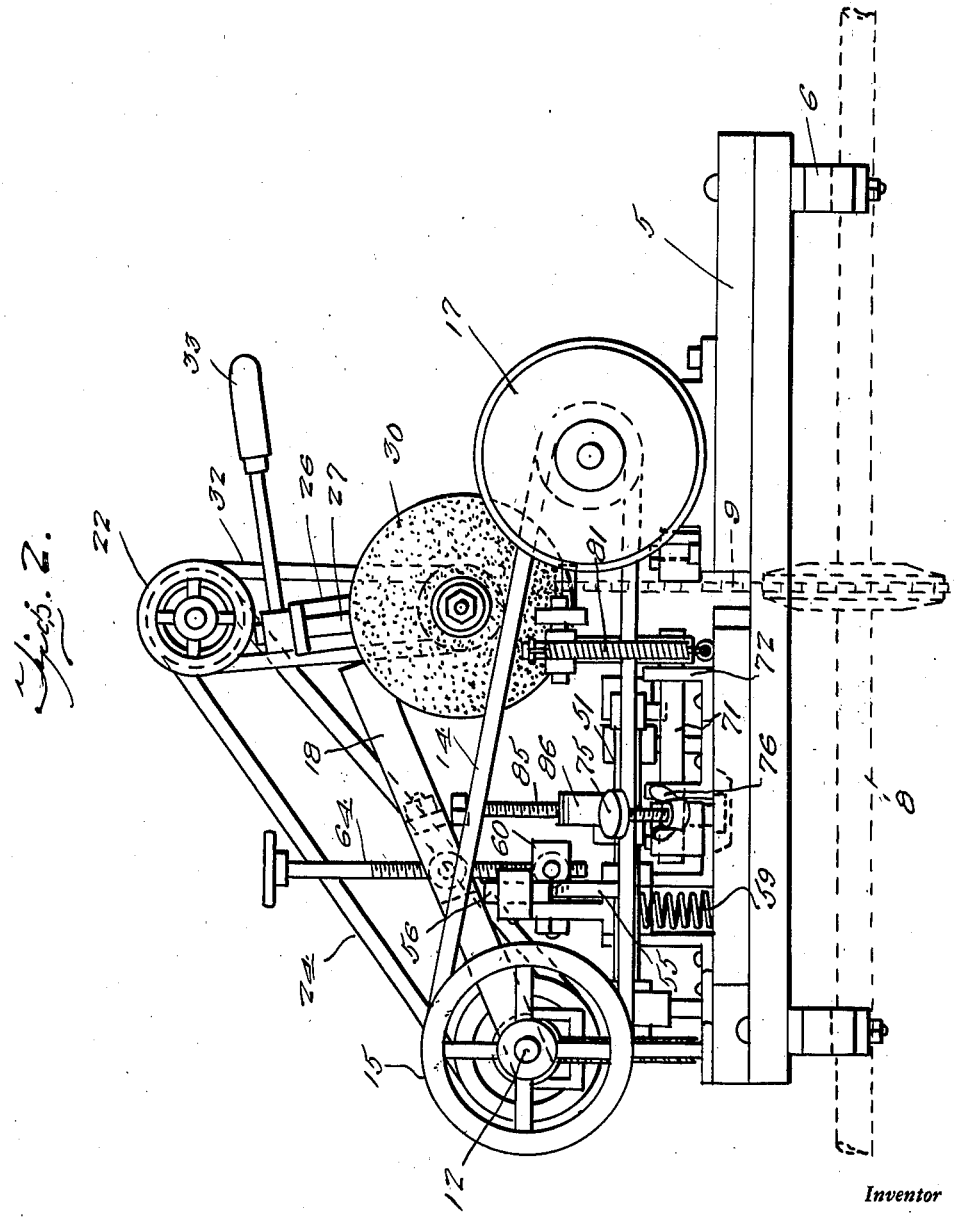

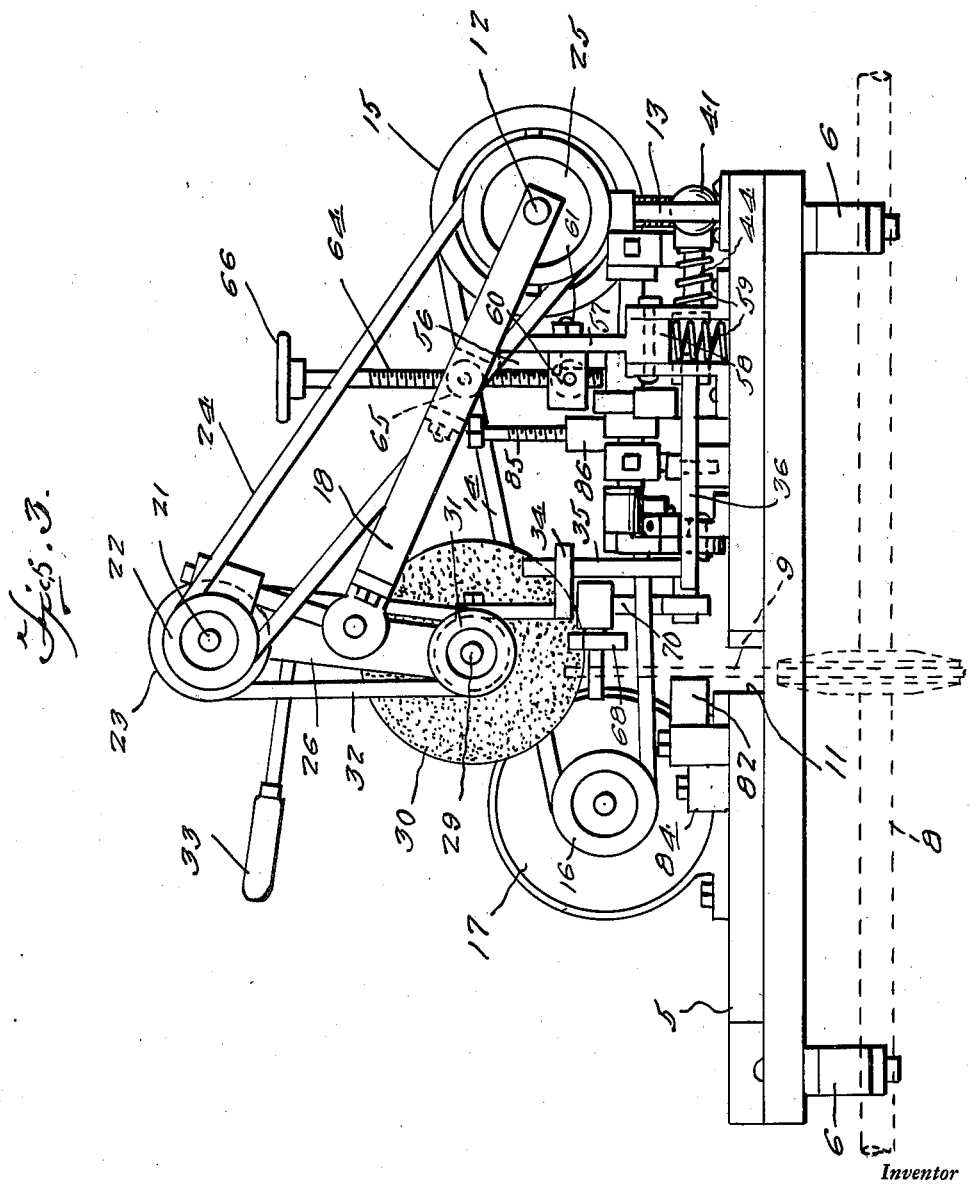

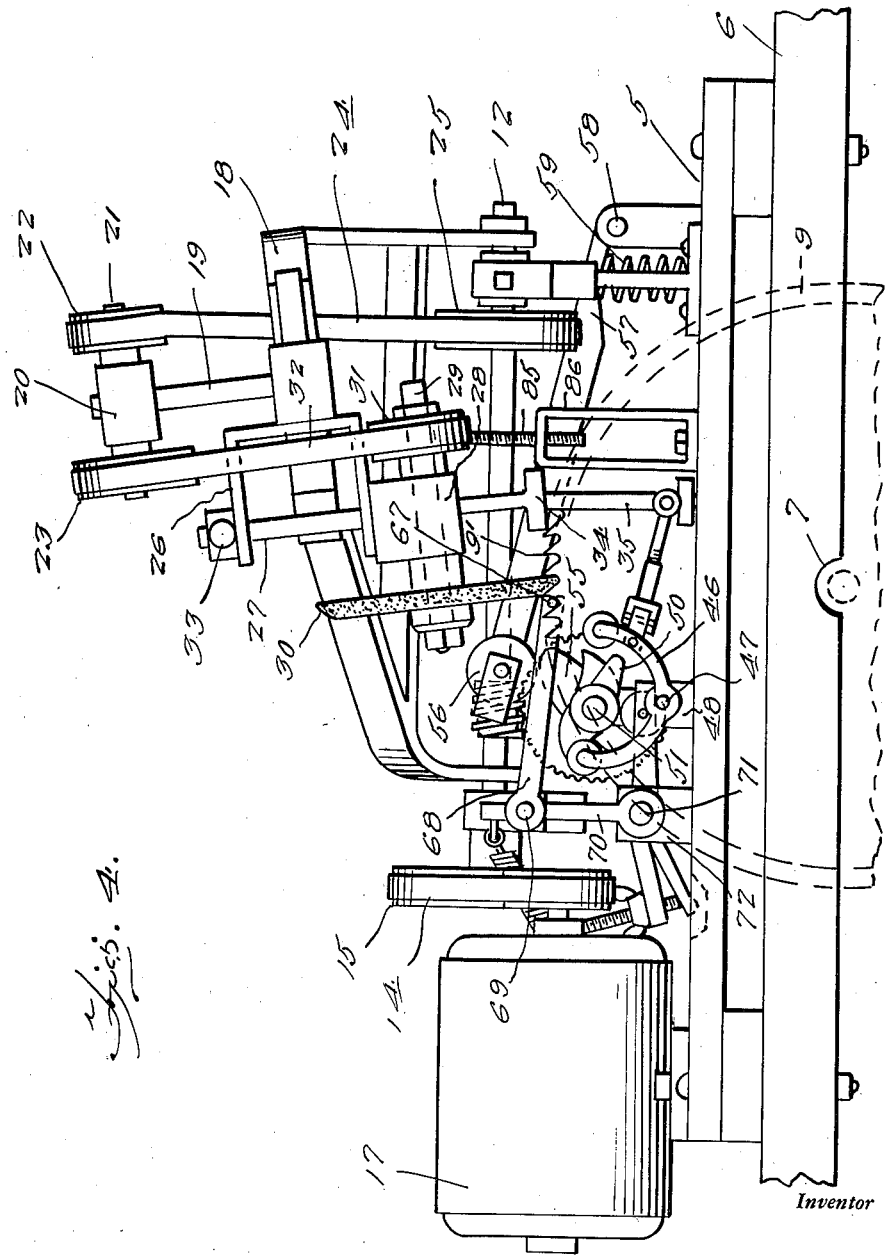

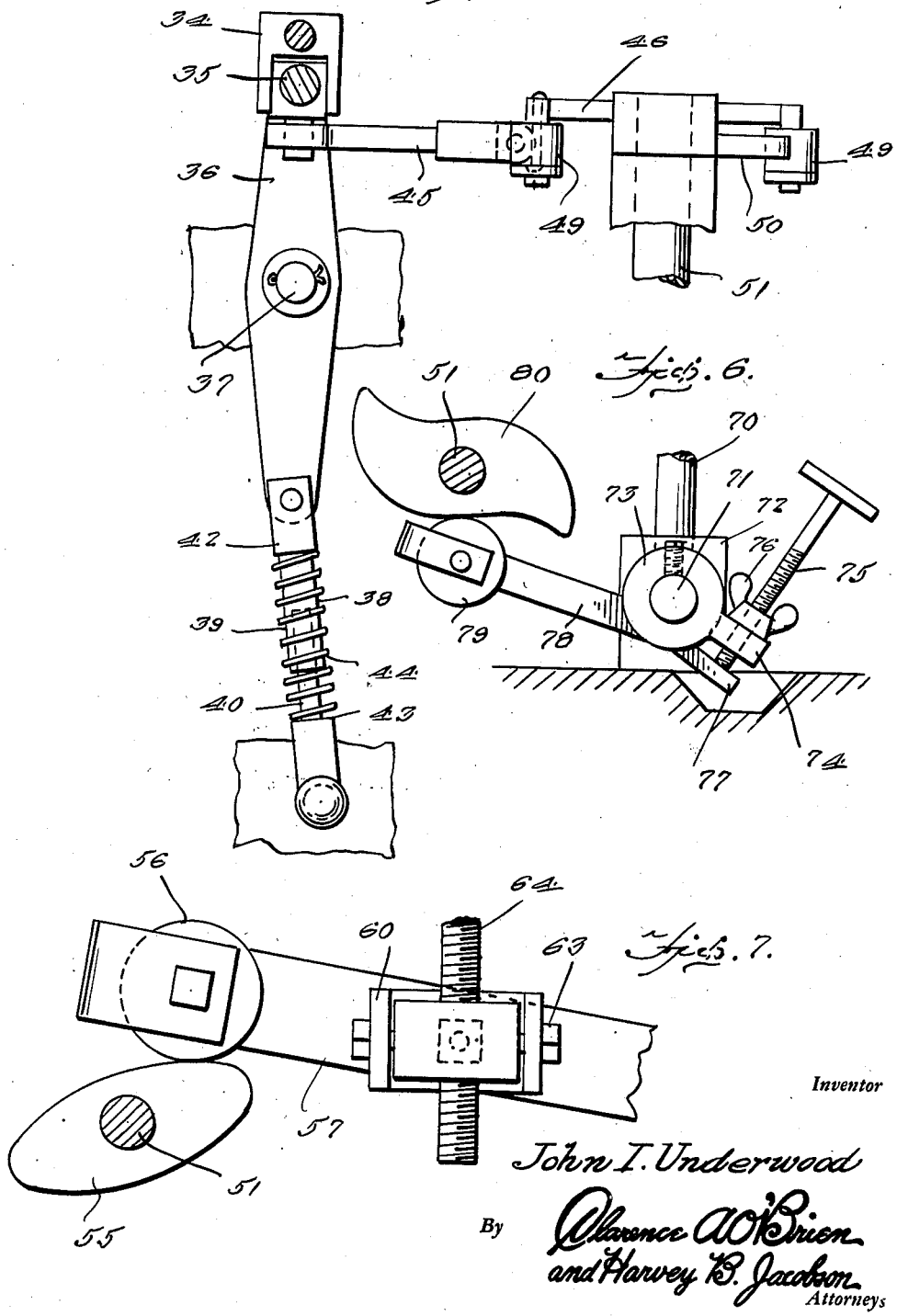

2,334,136

UNITED STATES PATENT OFFICE 2,334,136

SAW SHARPENING MACHINE

John I. Underwood, Victoria, Va.

Application September 4, 1942, Serial No. 457,374

5 Claims. (Cl. 76—40)

The present invention relates to new and useful improvements in saw sharpeners designed primarily for use in sharpening the saw of a double end trimmer, or for similar trimming saws used in conjunction with planing mills.

An important object of the present invention is to provide a saw sharpening apparatus adapted for mounting in position on the machine and embodying means for feeding the teeth of the saw in a step by step movement for engagement by the abrasive wheel of the sharpener, together with means for raising and lowering the abrasive wheel into its position for sharpening the successive teeth of the saw and also embodying means for changing the angle of the abrasive wheel for sharpening the bevel on opposite sides of the teeth of the saw; and to further provide a machine of this character adapted for sharpening the saw without the necessity of removing the saw from the saw machine.

A still further object is to provide an apparatus of this character of simple and practical construction, which is efficient and reliable in performance, relatively inexpensive to manufacture and maintain in operation and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout and in which:

Figure 1 is a top plan view.

Figure 2 is a front elevational view.

Figure 3 is a rear elevational view.

Figure 4 is a side elevational view.

Figure 5 is an enlarged fragmentary detail of the oscillating mechanism for moving the abrasive wheel into its opposite angular positions.

Figure 6 is a detail of the cam actuated rock shaft for feeding the saw in a step by step movement.

Figure 7 is a detail of the cam actuated mechanism for raising and lowering the abrasive wheel.

Referring now to the drawings in detail, wherein for the purpose of illustration I have disclosed a preferred embodiment of the invention, the numeral 5 designates a platform having spaced parallel beams 6 at the opposite sides thereof adapted to rest on the frame of a double end trimmer or similar saw machine (not shown), the beams having a notch 7 in the underside thereof to accommodate the shaft 8 to which the saw 9 is secured. The ends of the beams 6 project outwardly from the front and rear edges of the platform to provide hand grips 10 to facilitate the placing of the saw sharpening apparatus into and out of position with respect to the saw machine. The platform 5 is formed with a slot 11 through which the saw 9 projects.

A shaft 12 is journaled adjacent opposite ends in bearing supports 13—13 rising from the platform, the shaft being driven by a belt 14 and pulleys 15 and 16 secured respectively to the shaft and to a motor 17 mounted on the platform.

A frame 18 is pivotally supported at one end on the shaft 12, the opposite end of the frame having a bearing support 19 rising therefrom on the upper end of which a bearing 20 is supported having a shaft 21 journaled therein, each end of the shaft having pulleys 22 and 23 secured thereto. The pulley 22 is driven by a belt 24 from a pulley 25 also secured to the shaft 12. Also secured to the free end of the frame 18 is a U-shaped bracket 26 having a bearing support 27 vertically disposed therein and mounted for pivotal movement in the bracket 26. To the lower end of the support 27 is secured a bearing 28 in which a shaft 29 is journaled, the shaft 29 having an abrasive wheel 30 secured at one end and is provided with a pulley 31 at its opposite end driven by a belt 32 from the pulley 23. To the upper end of the bearing support 27 is secured a handle 33 projecting horizontally therefrom and by means of which the bearing support 27 with the abrasive wheel 30 thereon may be manually oscillated.

Projecting downwardly from the bearing support 27 is a yoke 34 in which is positioned the upper end of an upstanding rod 35 rising from one end of a bar 36 pivoted intermediate its ends as at 37 on the platform for horizontal oscillating movement. To the other end of the bar 36 is pivotally secured a sectional link 38 composed of telescoping sections 39 and 40, one end of the section 40 being pivoted to a ball and socket connection 41 on the platform. The section 39 is formed with a shoulder 42 and the section 40 is formed with a shoulder 43 between which a coil spring 44 is positioned under tension to maintain the bar 36 in either of its off-center positions with respect to the bar 36 as indicated by the full and dotted line positions in Figure 1 of the drawings.

To the end of the bar 36 opposite from the link 38 is a laterally extending arm 45 pivotally attached at its outer end to a curved member 46 which is pivoted intermediate its ends as at 47 on a support 48 of the platform. The ends of the member 46 are provided with rollers 49 engageable by a cam 50 for rocking the member 46 in opposite directions during rotation of the cam.

The cam 50 is secured on a shaft 51 journaled in bearing brackets 52 supported on the platform, one end of the shaft 51 having a worm gear 53 secured thereto driven by a worm 54 on the shaft 12.

Also secured on the shaft 51 is an elliptical cam 55 riding under a roller 56 journaled at one end of an arm 57 which is pivoted at its opposite end as at 58 on the platform. A coil spring 59 positioned under the arm 57, adjacent its pivoted end, urges the arm upwardly to counterbalance the weight of the arm and the mechanism attached thereto.

A yoke 60 is pivotally mounted on a pin 61 intermediate the ends of the arm 57, the yoke having a block 62 pivotally supported thereon by the trunnions 63 and threaded through the block is a screw 64 which is also threaded through a pivotally mounted block 65 carried at an intermediate portion of the frame 18. The upper end of the screw is formed with a manipulating hand wheel 66.

Accordingly, through the operation of the cam 55 and arm 57 the screw 64 and frame 18 are raised and lowered whereby to raise and lower the abrasive wheel 30 into and out of engagement with the teeth 9' of the saw 9. The throw of the frame 18 in its upward and downward movement is regulated by the adjustment of the screw 64 in a manner as will be apparent while at the same time the abrasive wheel 30 is oscillated to change the angle thereof so as to sharpen the beveling on the opposite teeth of the saw by means of the cam 50, the curved member 46, arm 45 and upstanding pin 35 which engages the pivotal support 27 of the abrasive wheel through the yoke 34.

The saw 9 is moved in a step by step movement for successively sharpening the teeth of the saw by means of a pin 67 disposed transversely of the saw for engaging the teeth thereof, the pin being mounted on the outer end of an arm 68 pivoted as at 69 on the upper end of a lever 70 secured on a shaft 71 journaled in brackets 72 on the platform.

The shaft 71 has a collar 73 secured thereto provided with a radially extending lug 74 through which an adjusting screw 75 is threaded and secured in adjusted position by a wing nut 76. One end of the screw 75 engages an extension 77 on one end of an arm 78 freely mounted on the shaft 71, the other end of the arm 78 having a roller 79 journaled thereon positioned under and engaged by a double-ended cam 80 also secured on the shaft 51. The cam 80 actuates the shaft 71 through the arm 78, extension 77, lug 74 and collar 73, the cam 80 rocking the shaft 71 in one direction while the spring 81 attached to the upper end of the lever 70 actuates the shaft 71 and arm 68 in an opposite direction to cause a reciprocating movement of the arm 68 for moving the saw 9 in a step by step movement.

A brake member 82 in the form of a pivotally mounted arm on the platform 5 bears against the side of the saw to restrain idle rotation thereof, pressure being exerted on the brake 82 by a lever 83 and cam 84.

A screw 85 threaded in a support 86 on the platform acts as an adjustable stop with which an intermediate part of the frame 18 engages to limit its downward movement.

From the foregoing it will be apparent the raising and lowering movement of the frame 18 will raise and lower the abrasive wheel 30 into and out of engagement with the teeth of the saw, as the latter is moved by the arm 68.

The angle of the wheel 30 is changed to properly grind the leveling on the alternately arranged teeth of the saw by the oscillation of the support 27.

It is believed the details of construction, advantages and manner of use of the device will be readily understood from the foregoing without further detailed explanation.

Having described the invention, what is claimed as new is:

1. A saw sharpener comprising in combination a mechanism for moving the saw in a step by step movement, an abrasive element, means for raising and lowering the abrasive element into and out of sharpening engagement with successive teeth of the saw, and means for oscillating the axis of the abrasive element to move the latter into different angular positions with respect to the angularity of the teeth, said last named means comprising a pivotal mounting for the abrasive element, a yoke carried by the mounting, a pivoted bar having a member at one end engaging the yoke, mechanism connected to the bar for operating the latter in opposite directions, and spring means engaging the bar to yieldably maintain the bar in its opposite positions.

2. A saw sharpener comprising a pivoted abrasive wheel support, an abrasive wheel rotatably and oscillatably mounted on the support, a cam shaft, cams on the shaft, a pivoted arm connected transversely to the support and actuated by one of the cams for moving the support for engaging the wheel with the teeth of a saw, and means operatively engaged by another of said cams for oscillating the axis of the wheel into different angular positions in accordance with the angularity of the teeth.

3. A saw sharpener comprising an abrasive wheel support mounted for vertical pivotal movement, an abrasive wheel rotatably and oscillatably mounted on the support, a cam shaft, cams on the shaft, a pivoted arm extending transversely of the support and actuated by one of the cams, an adjusting screw connecting the arm to the support for moving the support for engaging the wheel with the teeth of a saw, means operatively engaged by another of said cams for oscillating the axis of the wheel into different angular positions in accordance with the angularity of the teeth, and means for continuously rotating the wheel during its bodily movement and for operating the cam shaft.

4. A portable saw sharpener comprising a platform adapted for removably mounting on a saw machine and having a slotted opening for receiving a saw to be sharpened, a cam shaft mounted on the platform, cams on the shaft mechanism on the platform operated by one of the cams for engaging and moving the saw in a step by step movement, an abrasive wheel rotatably, oscillatably and pivotally mounted on the platform for bodily movement into and out of engagement with the saw, a pivotal mounting for the axis of the wheel for changing the angle of the wheel with respect to the teeth of the saw, and mechanism on the platform respectively operated by the remaining cams for oscillating and pivotally actuating the wheel.

5. A portable saw sharpener comprising a platform adapted for removably mounting on a saw machine and having a slotted opening for receiving a saw to be sharpened, a cam shaft mounted on the platform, cams on the shaft mechanism on the platform operated by one of the cams for engaging and moving the saw in a step by step movement, an abrasive wheel rotatably, oscillatably and pivotally mounted on the platform for bodily movement into and out of engagement with the saw, a pivotal mounting for the axis of the wheel for changing the angle of the wheel with respect to the teeth of the saw, mechanism on the platform respectively operated by the remaining cams for oscillating and pivotally actuating the wheel and a power means on the platform for operating the shaft and for rotating the abrasive wheel.

JOHN I. UNDERWOOD.